United States Patent [19]

Iwabuchi et al.

[11] Patent Number: 4,918,672
[45] Date of Patent: Apr. 17, 1990

[54] ULTRASONIC DISTANCE SENSOR

[75] Inventors: Makoto Iwabuchi, Tone; Sinichi Ohzawa, Tokyo, both of Japan

[73] Assignee: Niles Parts Co., Ltd., Tokyo, Japan

[21] Appl. No.: 231,360

[22] Filed: Aug. 11, 1988

[51] Int. Cl.⁴ .............................................. G01S 15/00
[52] U.S. Cl. ...................................... 367/99; 367/903; 367/188
[58] Field of Search ............... 367/903, 178, 188, 157, 367/99, 165; 381/169, 188; 310/345, 348

[56] References Cited

U.S. PATENT DOCUMENTS 4,572,253  2/1986  Farmer et al. ...................... 367/908
4,779,246 10/1988  Dietzsch et al. ..................... 367/157

FOREIGN PATENT DOCUMENTS 50-129252 10/1975 Japan.

Primary Examiner—Nelson Moskowitz
Assistant Examiner—Daniel T. Pihulic
Attorney, Agent, or Firm—Ronald P. Kananen

[57] ABSTRACT

An ultrasonic distance sensor transmitting from and receiving an ultrasonic wave with a single ultrasonic transmitting and receiving element to measure proximate distances such as vehicle floor heights or distances to obstacles or pedestrians approaching relative to a vehicle. The ultrasonic transmitting and receiving element is accommodated by means of a resilient member having beads, under pressure in a casing and secured therein, thus attenuating residual vibration which disturbs accurate measurement of the proximate distances. The beads also serve to prevent water from invading into the case. The sensor incorporates a protection circuit for preventing burn-out of an output transistor due to accidental prolonged transmission.

9 Claims, 3 Drawing Sheets

ULTRASONIC DISTANCE SENSOR

BACKGROUND OF THE INVENTION

This invention relates to improvements in ultrasonic distance sensors which detect proximate distances by transmitting an ultrasonic wave by means of a single ultrasonic transmitting and receiving element, receiving the ultrasonic wave reflected back to the same element, and then measuring the time required for the reflected ultrasonic wave to arrive at the element.

DESCRIPTION OF THE PRIOR ART

Recently, ultrasonic distance sensors of various types have been developed which are mounted on vehicles to measure the floor heights of the vehicles, the distances between the vehicles, and obstacles around the vehicles, or the like.

The aforementioned ultrasonic distance sensors for measuring the floor heights of the vehicles (referred to generally as a "road surface sensor") have been developed for mounting under the floors of the vehicles to measure the distances between the vehicle floor and the road surface. A road surface sensor measures sequentially the distance between a vehicle floor and the road surface while the vehicle is traveling. An output signal of the road surface sensor is fed to a suspension control device which controls stiffness of the suspension and the floor height of the vehicle. Where the distance between the road surface and the vehicle body changes significantly due to a rough road surface, the sensor serves to stiffen the vehicle suspension, or to raise the floor height of the vehicle. Moreover, where the distance between the road surface and the vehicle body does not change significantly due to a flat road surface, the sensor serves to cause a soft suspension or a lower floor height for the vehicle. The output signal from the sensor thus controls vehicle suspension characteristics and vehicle height.

On the other hand, ultrasonic distance sensors for measuring the distance to obstacles in the vicinity of the vehicle, or the distance to pedestrians (referred to generally as an "obstacle sensor"), are used as a warning sensor. The obstacle sensor is mounted on a vehicle near a bumper or at a side portion of the vehicle to detect obstacles or pedestrians approaching relative to the vehicle when driving into a car port or making a left turn or a right turn. The obstacle sensor thus transmits a signal to a distance-display means provided within the vehicle or a device for generating an alarm sound or a voice warning to prevent accidental contact of the vehicle body with such sensed obstacles.

These ultrasonic distance sensors are generally formed of a transmitter or a sender and a receiver in a pair. On the other hand, as disclosed in Japanese Patent Preliminary Publication No. 50-129252, it is more advantageous in terms of price and reduction of size, weight and number of parts to arrange the sensors with a single ultrasonic transmitting and receiving element.

However, with a combined ultrasonic transmitting and receiving element employed as an ultrasonic distance sensor mounted on a vehicle, it has been necessary to solve the following problems.

The road surface sensor is required to measure a vehicle floor height of, for example, about 20 to 30 cm. In transmitting and receiving across these short, proximate distances, the elapsed time required between the time of transmitting an ultrasonic wave and the time of receiving the same ultrasonic wave reflected at the road surface is about 1.2 to 1.8 msec at normal temperature. The ultrasonic transmitting and receiving element continues to transmit residual vibrations for some time, for example, about 20 msec as shown by t7 in FIG. 7, after transmission of ultrasonic wave is terminated. Thus, the received signal r tends to be buried in the background of the residual vibrations, which makes it difficult to detect the reflected wave. The problem applies equally as well to the obstacle sensors.

In addition, the ultrasonic transmitting and receiving element is driven by a timing signal from a control circuit by means of an output transistor. This timing signal is a pulse having a narrow pulse width, for example, about 0.3 msec and is transmitted sequentially at a predetermined interval of, for example, about 20 msec. Thus, power dissipation of the aforementioned output transistor is low; therefore, low power transistors can be used. However, if the output power remains on, as shown by t6 in FIG. 6, due to a malfunction of or a miswiring of the control circuit, the power dissipation increases rapidly by several tens of times leading to burn-out of the output transistor.

Thus, it is a problem in this art to provide an ultrasonic distance sensor for a vehicle which improvedly detects a reflected wave and avoids burnout of the power transistor.

SUMMARY OF THE INVENTION

This invention was made to solve the aforementioned problem of residual vibration in an ultrasonic transmitting and receiving element, and to provide an ultrasonic distance sensor in which an ultrasonic wave is transmitted from and received by a single ultrasonic transmitting and receiving element to measure the time required for the reflected ultrasonic wave to arrive at the element for detecting proximate distances. The ultrasonic transmitting and receiving element is inserted with pressure into a casing and secured therein by means of a resilient member having beads. The invention is embodied to provide an ultrasonic distance sensor, in which at least one aforementioned bead for the resilient member is provided around an area where the surface of the ultrasonic transmitting and receiving element is exposed to the external space.

This invention was also made to solve the aforementioned problem of output transistor burn-out. An ultrasonic distance sensor is provided in which an ultrasonic wave is transmitted from and received by a single ultrasonic transmitting and receiving element to measure the time required for the reflected ultrasonic wave to arrive at the element for detecting proximate distances. A protection circuit for regulating the transmission time of the ultrasonic wave is provided between a control circuit which outputs a timing signal for transmitting an ultrasonic wave, and the aforementioned ultrasonic transmitting and receiving element. The invention is embodied to provide an ultrasonic distance sensor in which the aforementioned protection circuit is constituted by combining an AND circuit and a timer circuit, one input of the AND circuit being connected directly with the control circuit, and the other input of the AND circuit being connected with the control circuit via the timer circuit.

The aforementioned combined ultrasonic transmitting and receiving element transmits and receives an ultrasonic wave sequentially in accordance with the timing signal from a control circuit. The ultrasonic transmitting and receiving element exhibits a property that it generates residual vibrations such as those in speakers or music instruments that produce audible sounds. However, since the ultrasonic transmitting and receiving element, as described previously, is inserted into a casing with pressure and secured therein by means of a resilient member having beads to hold the ultrasonic transmitting and receiving element firmly in the casing, the residual vibration is thereby reduced.

In addition, the ultrasonic transmitting and receiving element is mounted on a vehicle, so that a vibration surface thereof is oriented outwardly, at a location frequently exposed to a large amount of rain or car-wash water. The aforementioned beads thus also serve as a water-tight packing.

In particular, the invasion of water or moisture into the casing due to capillarity can be prevented by providing the beads around a location where the vibration surface of the ultrasonic transmitting and receiving element is exposed to the space external to the casing. The opening or aperture of the casing is closest to the vibration surface of the ultrasonic transmitting and receiving element. Thus, providing the beads at this location can further improve an attenuation effect of the residual vibration. The aforementioned combined ultrasonic transmitting and receiving element transmits an ultrasonic wave sequentially in accordance with a timing signal from a control circuit and also receives the reflected wave. Then, the protection circuit makes a decision whether or not the pulse width of the timing signal from the control circuit is within the predetermined time. If the timing signal lasts longer than a predetermined value due to, for example, a malfunction of the control circuit, then the transmission time of the ultrasonic wave is restrained by the protection circuit so as not to exceed the predetermined value. That is, the protection circuit prevents continuous operation of the ultrasonic transmitting and receiving element. Furthermore, where the protection circuit is formed from an AND circuit and the timer circuit, the transmission time is regulated by the timing from the timer circuit. The AND circuit allows timing signals having pulse widths narrower than the signal from the timer to pass through the AND circuit.

These and other features of the invention will become apparent from the detailed description of the invention which follows, taken in conjunction with the accompanying drawings.

BRIEF DESCRIPTION OF THE DRAWINGS

In the drawings:

FIG. 1 to FIG. 5 show a preferred embodiment according to the present invention wherein:

FIG. 1 is a cross sectional view of an ultrasonic transmitting and receiving element assembled within a casing;

FIG. 2 is an exploded elevational view of the assembly shown in FIG. 1;

FIG. 3 is a perspective top view of the assembly shown in FIG. 1;

FIG. 4 is an electrical schematic diagram which includes the element shown in FIG. 1;

FIG. 5 shows the electrical characteristics of the respective circuits shown in FIG. 4.

PREFERRED EMBODIMENTS OF THE INVENTION

Figure 1:
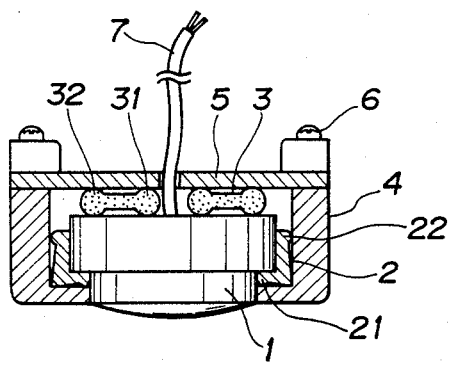
Figure 2:
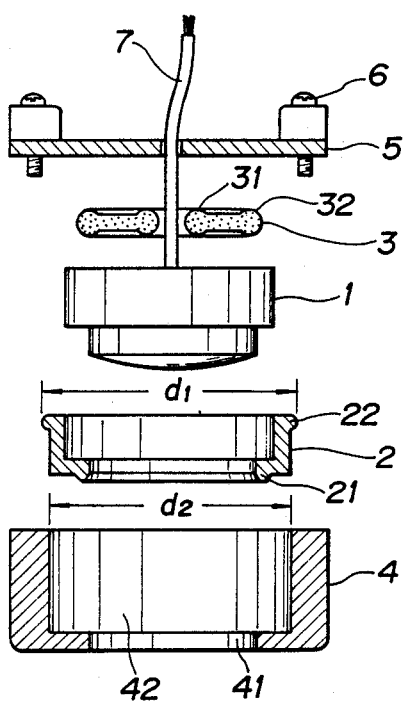
Figure 3:
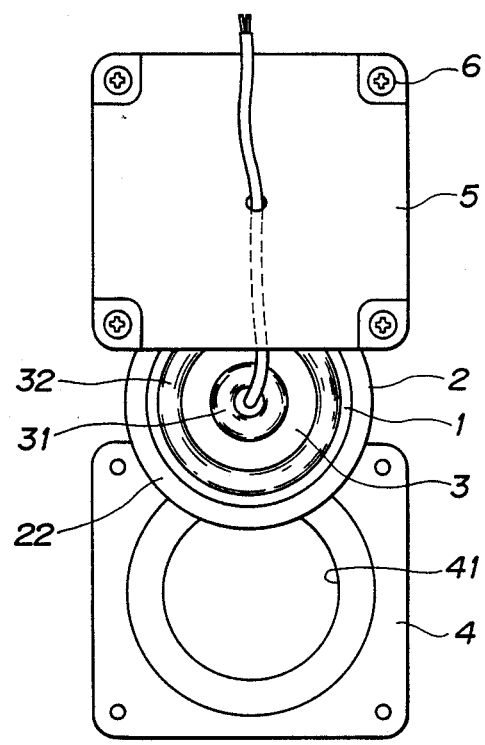

As shown in FIGS. 1–3, an ultrasonic transmitting and receiving element 1 includes a vibration element incorporating a piezo electric element (not shown) and generates an ultrasonic wave of, for example, about 30 kHz by an external excitation.

A first resilient member 2 is formed in the shape of a circular hollow cylinder, and has a first bead 21 at an opening or aperture 41 of a casing and a second bead 22 at the opposite location. The first resilient member 2 has an axially-extending wall merging at one end into a radially-inwardly-extending flange terminating at an axially-outward portion in the bead 21. The casing 4 includes an axially-extending wall terminating with an inwardly-turned radially-extending member defining an opening for the element 1. When assembled, the bead 21 rests on the inward surface of the radially-extending member to seal the opening adjacent the member 1.

The first resilient member 2 terminates at an opposite end of the axially-extending wall in the bead 22 which extends radially-outwardly.

A second resilient member 3 is formed in the shape of a circular disk of the same material as the first resilient member, and has a first bead 31 at the inner circumferential edge thereof and a second bead 32 at the outer circumferential edge thereof.

The casing 4 and a cover 5 are plastic molded or diecast products or the like, and have a recess 42 with an inner diameter d2 slightly smaller than the outer diameter d1 of the first resilient member 2, as best seen in FIG. 2. A procedure for assembling the aforementioned respective components will now be described as follows.

First, the first resilient member 2 is attached to the ultrasonic transmitting and receiving element 1, to form a first assembly, and then the first assembly is press-fitted into the casing 4. The outer diameter d1 of the first resilient member 2 is formed slightly larger than the inner diameter d2 of the casing 4 by a protruded dimension of the radially-extending second bead 22. Thus, the aforementioned assembly is inserted with pressure into the casing 4. The second resilient member 3 is then placed on the ultrasonic transmitting and receiving element 1. Then, the cover 5 is positioned; thereafter, the cover 5 is secured to the casing 4 by means of tapping screws 6. Screwing the tapping screws 6 into the case 4 causes a pressure contact between the first bead 21 of the first resilient member 2 against the casing 4.

Figure 5:
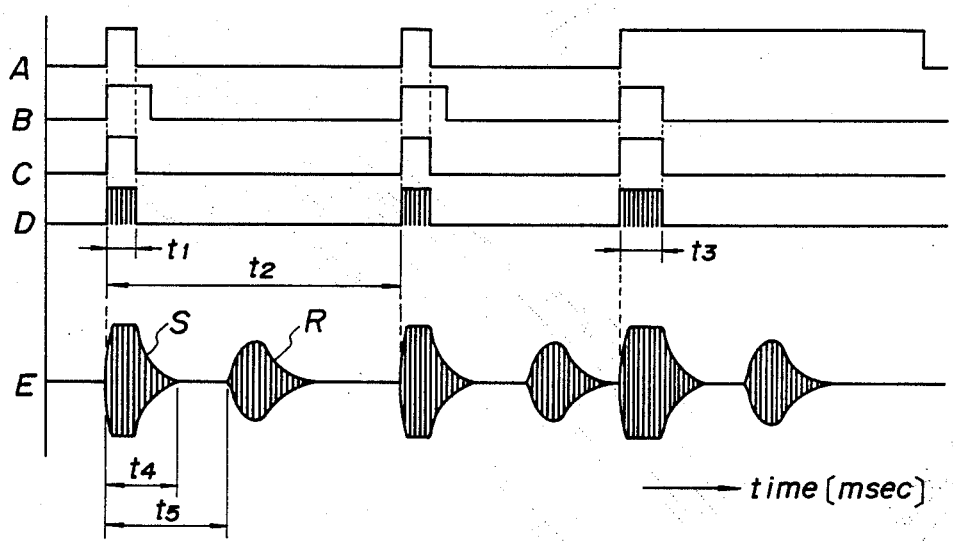
Figure 6:
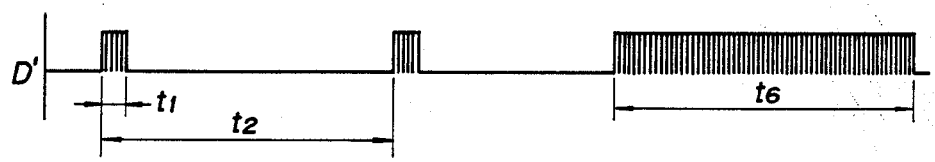
FIG. 6 and FIG. 7 show electrical characteristics of a prior art sensor.
Figure 7:
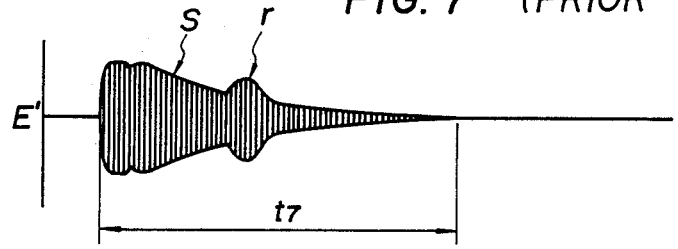

In this way, since the ultrasonic transmitting and receiving element 1 is inserted into the casing 4 with pressure by means of the first resilient member 2 and the second resilient member 3, the residual vibration is attenuated like a transmitted waveform S as shown by curve E in FIG. 5.

Figure 4:
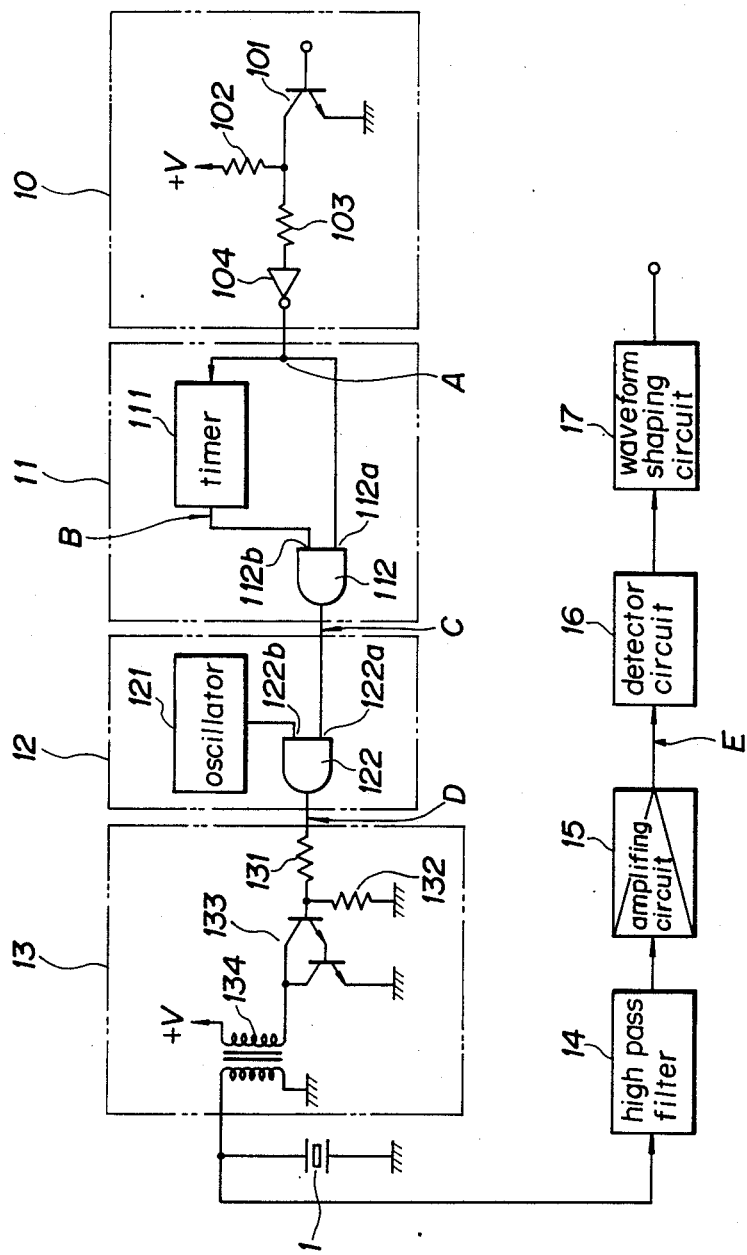

The arrangement and operation of the circuit in FIG. 4 will now be described as follows.

A control circuit 10 is formed of a transistor 101, resistors 102, 103, and an inverter 104. The base of the transistor 101 is connected with a circuit such as a microcomputer (not shown) or the like. The control circuit 10 is a circuit which outputs, in accordance with the program or the like of the microcomputer, a timing pulse signal t1 having a duration of, for example, 0.3 msec at an interval t2 having a duration of, for example, 20 msec to a protection circuit 11 in a succeeding stage. The protection circuit 11 is a gate circuit constituted by a timer circuit 111 and an AND circuit 112. One input 112a of the AND circuit 112 is connected with the control circuit 10. The other input 112b of the AND circuit 112 is connected with the control circuit 10 via a timer circuit 111.

The timer circuit 111 is a circuit constructed with, for example, a one-shot multivibrator, which outputs a one-shot pulse signal having a duration t3 of, for example, 1 msec as shown by curve B in FIG. 5, to a succeeding AND circuit 112 every time the timer circuit 111 receives a timing signal from the control circuit 10.

The AND circuit 112 outputs a signal of a logic "1" level when two inputs thereof are both at a logic "1" level 1. Thus, when signals A and B as shown in FIG. 5 are input to the AND circuit 112, the AND circuit 112 selects a signal having a narrower pulse width and then outputs a signal C as shown in FIG. 5. Consequently, if the signal A in FIG. 5 remains at a logic "1" level due to internal wiring accidents or the like of the control circuit 10, the pulse width of the signal C in FIG. 5 is limited to t3 msec by the one-shot pulse signal from the timer circuit 111 thereby preventing an output circuit 13 from continuing to be in an "on" state to avoid burn-out of an output transistor 133.

An oscillator unit 12 is a gate circuit constructed by an oscillator 121 and an AND circuit 122. One input 122a of the AND circuit 122 is connected with the protection circuit 11, and the other input 122b of the AND circuit 122 is connected with the oscillator 121. The AND circuit 122 feeds the oscillator output of about 30 kHz as shown by curve D in FIG. 5 to a succeeding stage, the output circuit 13, during the time the timing pulse signal is input to the AND circuit 122 via the protection circuit in the preceding stage.

The output circuit 13 is constructed by resistors 131, 132, an output transistor 133 and an output transformer 134. The output transistor 133 is actually of a Darlington arrangement, and the output transformer 134 is selected for its winding ratio of the primary winding to the secondary winding so that the transformer steps up the voltage applied to the primary winding connected with the output transistor 133, and then outputs to the secondary winding.

A high pass filter 14, an amplifying circuit 15, a detector circuit 16 and a waveform-shaping circuit 17 are of conventional types, respectively. The amplifying circuit 15 outputs an ultrasonic transmitted wave S and a received wave R as shown by curve E in FIG. 5, which waves are to be transmitted from or received by the ultrasonic transmitting and receiving element 1. Thus, it is possible to know the distance from the ultrasonic transmitting and receiving element 1 to a reflecting subject by measuring the time t5 in msec between which the ultrasonic wave is transmitted and the signal R as shown by curve E in FIG. 5 is received.

Although the present invention is suitably applied to measurement systems mounted on vehicles for measuring proximate distances such as vehicle floor heights or the distances between vehicles and obstacles, it is of wide application including automatic doors, automated production lines as well as robots in factories. Also, the invention can be applied to liquid level meters. The protection circuit may be arranged by a counter circuit, which counts the ultrasonic signal transmitted so that the transmission of ultrasonic signals is restrained not to exceed a predetermined amount of time.

The invention is characterized, as described previously, in that a single, combined ultrasonic wave transmitting and receiving element is press-fitted into a casing or housing and attached thereto by means of a resilient member having beads. Thus residual vibration of the ultrasonic transmitter is quickly attenuated, thereby permitting measurement of proximate distances such as vehicle floor heights. Providing the resilient beads around an area at which the vibration surface of the ultrasonic transmitting and receiving element is exposed to the external space, provides a watertight effect as well as improved attenuation of the aforementioned residual vibration. The ultrasonic wave distance sensor is particularly suited to measure proximate distances relative to vehicles while also it can be advantageously applied to various fields.

The invention is also characterized, as described, in that the sensor incorporates a control circuit which outputs a timing signal for activating ultrasonic wave transmission, and a protection circuit which restrains the time during which the ultrasonic wave is transmitted. Thus burn-out of an output transistor, caused by malfunction of the control circuit, is prevented.

Constructing the protection circuit with an AND circuit and a timer circuit permits a simple circuit design, and the ultrasonic wave transmission time can be restrained by the timer circuit. That is, timing signals shorter than the time set by the timer are allowed to pass through.

What is claimed is:

1. An ultrasonic distance sensor whereby an ultrasonic wave is transmitted from and received by a single ultrasonic transmitting and receiving element to measure the time required for a reflected ultrasonic wave to arrive at said element for detecting proximate distances, comprising:
   a casing having an opening therein for receiving an ultrasonic transmitting and receiving element;
   an ultrasonic transmitting and receiving element having a portion located in said opening; and
   a first resilient member for securing said element in said casing by pressure, said resilient member lying intermediate said element and said casing and having first and second beads in contact respectively with an opening portion and a side portion of an inner surface of said casing.

2. The sensor as set forth in claim 1 further comprising:
   control circuit means for outputting a control circuit output signal having a predetermined duration and interval;
   protection circuit means in circuit with said control circuit means and a timer circuit, said protection circuit means for receiving said control circuit output signal and a timer circuit output signal and selecting which has a shorter duration, said protection circuit means providing a protection circuit output signal representative thereof; and
   a drive circuit for operating said element, said drive circuit being controlled by said protection circuit output signal.

3. The sensor as set forth in claim 2 wherein said protection circuit means includes an AND circuit having an input in circuit with said timer circuit and another circuit in circuit with said control circuit means.

4. The sensor as set forth in claim 1 wherein said casing includes an axially-extending portion terminating in a radially-inwardly-extending portion which defines said opening, a bead on said first resilient member contacting an inner surface of said casing at said opening.

5. The sensor as set forth in claim 4 wherein a second bead on said first resilient member contacts said axially-extending portion, whereby said element is press-fitted into said casing.

6. The sensor as set forth in claim 1 further including protection circuit means are provided for restraining transmission time for an ultrasonic wave produced by said element.

7. The sensor as set forth in claim 6 further including a control circuit for outputting a timing signal for transmitting said ultrasonic wave.

8. The sensor as set forth in claim 7 wherein said protection circuit means includes an AND circuit, an input of said AND circuit being connected directly with said control circuit by way of a timer circuit.

9. An ultrasonic distance sensor wherein an ultrasonic wave is transmitted from and received by an ultrasonic transmitting and receiving element to measure the time required for a reflected wave to measure the time required for a reflected wave to arrive at the element for detecting proximate distance, comprising:

control circuit means for outputting a control circuit output signal having a predetermined duration and interval;

protection circuit means in circuit with said control circuit means and a timer circuit, said protection circuit means for receiving said control circuit output signal and a timer circuit output signal and selecting which has a shorter duration, said protection circuit means providing a protection circuit output signal representative thereof; and a drive circuit for operating said element, said drive circuit being controlled by said protection circuit output signal.

* * * * *